US012589632B2

(12) United States Patent
Oh et al.

(10) Patent No.: US 12,589,632 B2
(45) Date of Patent: Mar. 31, 2026

(54) VEHICLE CONDENSER

(71) Applicants:Hyundai Motor Company, Seoul (KR); Kia Corporation, Seoul (KR)

(72) Inventors: Man Ju Oh, Yongin-si (KR); Sang Shin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 976 days.

(21) Appl. No.: 17/742,473

(22) Filed: May 12, 2022

(65) Prior Publication Data

US 2023/0131951 A1 Apr. 27, 2023

(30) Foreign Application Priority Data

Oct. 25, 2021 (KR) ........................ 10-2021-0142867

(51) Int. Cl.
B60H 1/32 (2006.01)
B60H 1/22 (2006.01)

(52) U.S. Cl.
CPC ......... B60H 1/3227 (2013.01); B60H 1/2221 (2013.01); *B60H 2001/3288* (2013.01)

(58) Field of Classification Search
CPC ...... B60H 1/2221; B60H 1/32; B60H 1/3227; B60H 2001/3288
USPC ....................................................... 392/451
See application file for complete search history.

(56) References Cited

U.S. PATENT DOCUMENTS 6,357,519 B1 3/2002 Ozaki et al.

FOREIGN PATENT DOCUMENTS

| EP | 2258571 B1 | | 4/2016 |
|----|-----------|---|--------|
| JP | H09222267 | * | 8/1997 |
| JP | H09222267 A | | 8/1997 |
| JP | 2009250574 A | | 10/2009 |
| JP | 2015037894 | * | 2/2015 |
| JP | 2015037894 A | | 2/2015 |
| JP | 2015191703 A | | 11/2015 |
| KR | 100590948 B1 | | 6/2006 |

* cited by examiner

*Primary Examiner* — Ibrahime A Abraham
*Assistant Examiner* — Joseph W Iskra
(74) *Attorney, Agent, or Firm* — SLATER MATSIL, LLP

(57) ABSTRACT

An embodiment vehicle condenser includes a heater including an internal space coupled to receive a refrigerant and a heat exchanger integrally formed with the heater and configured to allow the refrigerant heated in the heater to exchange heat with ambient air. In an embodiment, the heat exchanger includes a plurality of flow-path pipes, wherein a first side of each of the flow-path pipes is integrally connected to the heater, a tank integrally connected to a second side of each of the flow-path pipes and configured to collect the refrigerant after heat is exchanged in the flow-path pipes, and a return pipe that defines a flow path for the refrigerant collected in the tank to be discharged after the refrigerant passes through the heater.

6 Claims, 6 Drawing Sheets

VEHICLE CONDENSER

CROSS-REFERENCE TO RELATED APPLICATIONS

This application claims the benefit of Korean Patent Application No. 10-2021-0142867, filed on Oct. 25, 2021, which application is hereby incorporated herein by reference.

TECHNICAL FIELD

The present invention relates to a vehicle condenser.

BACKGROUND

A trend in recent years has been the increasing demand for environment-friendly vehicles, such as electric vehicles, due to an environmental issue with vehicles equipped with an internal combustion engine. However, the vehicles equipped with the internal combustion engine do not need separate energy for air heating in an indoor space in the vehicle because the air heating in the indoor space is possible using waste heat of the internal combustion engine. However, the environment-friendly vehicles, such as the electric vehicles, do not have a heat source. For this reason, the air heating is possible using separate energy. Thus, the fuel efficiency is decreased.

In turn, the decrease in the fuel efficiency causes a decrease in mileage of the electric vehicle. Thus, there occur problems, such as the inconvenience of having to frequently charge a battery.

A heat pump system that finds application in air conditioning apparatuses of the environment-friendly vehicles, such as the electric vehicles, is different from a heat pump system that finds application in air conditioning apparatuses of the vehicles equipped with the internal combustion engine.

Generally, the heat pump system serves as an air-conditioning and heating system that transfers thermal energy from a low-temperature heat source to a high-temperature heat source or transfers thermal energy from the high-temperature heat source to the low-temperature heat source using heat or condensing heat of refrigerant. During heating, the heat pump system absorbs heat from the outside and emits the absorbed heat indoors. During cooling, the heat pump system absorbs heat from the inside and emits the absorbed heat outdoors.

However, the environment-friendly vehicles, such as the electric vehicles, are additionally required to meet the thermal control needs of electric components, such as a battery and a motor, as well as of the air conditioning apparatus.

However, the thermal control needs of an indoor space in the environment-friendly vehicle, such as the electric vehicle, and the thermal control needs of the electric components thereof, such as the battery, are different from each other. For this reason, there is a need to develop technologies that can maximally save energy in a manner that independently meets the needs, and through the efficient cooperation among the indoor space and the electric components. Accordingly, the concept of integrated thermal control of a vehicle has been proposed to increase the thermal efficiency by independently heat-controlling each of the components and at the same time integrating the overall thermal control of the vehicle.

In order to perform the integrated thermal control of the vehicle, there is a need to integrally modularize a complex coolant line, a complex refrigerant line, and components. This modularization of the components is also necessary in terms of simple manufacturing and compact packaging.

When temperature of outside air is low, a heat pump system does not smoothly operate. In order to prepare for this situation, in an integrated thermal control system for a vehicle in which the heat pump system finds application, a water-heating heater for increasing the temperature of a battery is provided in the coolant line, and an air-heating heater for the air heating in the indoor space is provided in the refrigerant line. In this manner, various types of heaters are separately provided for configuration in an integrated thermal control circuit.

However, the separate mounting of the water-heating heater for increasing the temperature of the battery and the air-heating heater for the air heating in the indoor space is not efficient in terms of thermal control, and the number of components increases. For this reason, in recent years, a study on an improvement of the thermal control circuit and a decrease in the number of components has been steadily conducted.

The contents described above are intended merely to aid in understanding the background of embodiments of the present invention, and is not intended to mean that the present invention falls within the purview of the related art that is already known to a person of ordinary skill in the art.

SUMMARY

The present invention relates to a vehicle condenser. Particular embodiments relate to a vehicle condenser capable of heating refrigerant for use in a heat pump system and then causing the refrigerant to exchange heat with air.

An embodiment of the present invention provides a vehicle condenser that results from configurationally integrating a condenser in which heat exchange occurs and a heater heating coolant into one piece.

Embodiments of the present invention are not limited to the features described above. From detailed descriptions of embodiments of the present invention, it would be definitely apparent to a person of ordinary skill in the art that other features not mentioned above can be understood.

According to an embodiment of the present invention, there is provided a vehicle condenser for use in a vehicle heat pump system, the vehicle condenser including a heating unit having an internal space into which refrigerant is introduced and heating the refrigerant flowing in the internal space and a heat exchange unit which is integrally formed with the heating unit and in which, while flowing, the refrigerant heated in the heating unit exchanges heat with ambient air.

In the vehicle condenser, the heating unit may include a heater housing having an internal space in which the refrigerant flows, a heater main body being provided in the internal space in the heater housing and heating the flowing refrigerant, and a guide bracket being provided in the internal space in the heater housing and holding the heater main body in place in the internal space in the heater housing.

In the vehicle condenser, the heater housing may include a heater body having an internal space that is partitioned by a partition wall into a first internal space open at the top and a second internal space that is sealed, and a heater cover covering the top of the first internal space and thus sealing the first internal space.

In the vehicle condenser, an inlet port through which the refrigerant is introduced may be provided in one lateral surface on the first internal space side of the heater body, a least one first connection hole communicating with the heat exchange unit in such a manner that the refrigerant heated in the first internal space flows to the heat exchange unit may be formed in the other lateral surface on the first internal space side of the heater body, and the heater main body and the guide bracket may be mounted in the first internal space, and an outlet port through which the refrigerant is discharged may be provided in one lateral surface on the second internal space side of the heater body, and at least one second connection hole communicating with the heat exchange unit in such a manner that, after exchanging heat in the heat exchange unit, the refrigerant flows to the second internal space may be formed in the other lateral surface on the second internal space side of the heater body.

In the vehicle condenser, the heat exchange unit may include a plurality of flow-path pipes, one side of each of which is integrally connected to the heating unit, a tank which is integrally connected to the other side of each of the plurality of the flow-path pipes and in which the refrigerant collects after exchanging heat in the plurality of flow-path pipes, and a return pipe along which the refrigerant collecting in the tank flows to the heating unit in order to be discharged after flowing through the heating unit, wherein the refrigerant heated in the heating unit may exchange heat with air flowing in an indoor heating, ventilation and air conditioning apparatus while flowing along each of the plurality of flow-path pipes.

In the vehicle condenser, the heater housing may be partitioned into a first internal space into which the refrigerant is introduced for being heated and a second internal space from which the refrigerant is discharged, the plurality of flow-path pipes may be connected to the first internal space, and the return pipe may be connected to the second internal space.

In the vehicle condenser, the plurality of flow-path pipes may be connected to a lateral surface of the first internal space in such a manner as to be arranged to be spaced apart a distance in an upward-downward direction, and a heat sink fin that serves as an extension to a surface may be arranged in a space between the flow-path pipes adjacent to each other.

In the vehicle condenser, the guide bracket may guide a path along which the refrigerant introduced into the internal space in the heater housing flows.

In the vehicle condenser, the heater main body may be formed in the shape of a bar, and the one or more heater main bodies are arranged in an upward-downward direction in the internal space in the heater housing, and the guide bracket may be formed to be wrapped in a helical shape around the one or more heater bodies.

In the vehicle condenser, the heater main body may guide a path along which the refrigerant introduced into the internal space in the heater housing flows.

In the vehicle condenser, the heater main body may be formed in a helical shape and is arranged in an upward-downward direction in the internal space in the heater housing, and the guide bracket may be formed to a rectangular-frame shape that fixes the heater main body by encircling the heater main body from an outward direction.

According to an embodiment of the present invention, a component functioning as a heater is integrally formed with the condenser that causes the refrigerant to exchange heat with air. Thus, the effect of reducing the number of components in configuring an integrated thermal control circuit can be expected.

In addition, the effect of heating the refrigerant introduced into the condenser for heat exchange and thus an improvement in the heat exchange efficiency can be expected.

DETAILED DESCRIPTION OF ILLUSTRATIVE EMBODIMENTS

Figure 1:
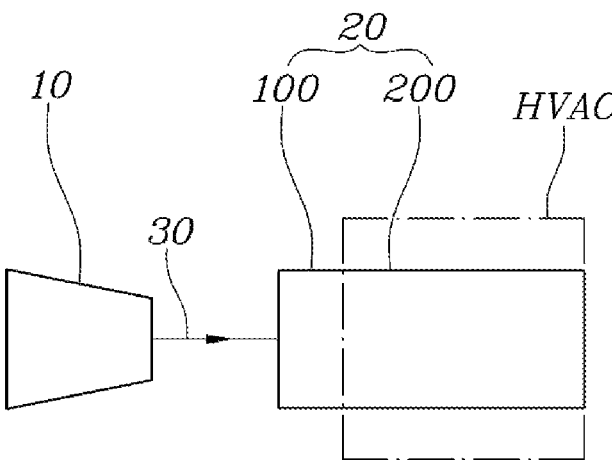
FIG. 1 is a view illustrating a portion of a thermal control circuit in which a vehicle condenser according to a first embodiment of the present invention finds application.

Embodiments of the present invention will be described in more detail below with reference to the accompanying drawings. However, the present invention is not limited to the embodiments disclosed below and can be practiced in various different forms. The embodiments are only provided to make a complete disclosure of the present invention and to provide full notice of the scope of the present invention to a person of ordinary skill in the art to which the present invention pertains. Like constituent elements are given like reference characters.

A vehicle condenser according to embodiments of the present invention is an apparatus that finds application in an integrated thermal control system that integrally performs thermal control of an indoor space in an environment-friendly vehicle, through thermal control of the battery and electric components. For example, the vehicle condenser finds application in a heat pump system that realizes air conditioning and heating through circulation of refrigerant.

FIG. 1 is a view illustrating a portion of a thermal control circuit in which a vehicle condenser according to a first embodiment of the present invention finds application. The refrigerant that circulates is sucked into a compressor 10. The refrigerant is compressed while passing through the compressor 10 and then is discharged in a compressed state. The refrigerant discharged in this manner passes through an indoor condenser of an indoor heating, ventilation, and air conditioning (HVAC) apparatus provided for air conditioning and heating in the indoor space in the vehicle, that is, through a condenser 20 according to the first embodiment of the present invention.

At this time, high-pressure high-temperature refrigerant introduced into the condenser 20 may be further heated while passing through a heating unit wo. The heated refrigerant exchanges heat with air flowing in the indoor heating, ventilation, and air conditioning apparatus, while passing through the heat exchange unit 200, and then is discharged from the condenser 20.

At this point, the compressor 10 and the condenser 20 are connected to each other with a flow-path pipe 30 along which the refrigerant flows. However, while the refrigerant to be discharged from the compressor 10 is compressed, the temperature thereof is increased. For this reason, it is desirable that the flow-path pipe 30 is configured as a high-pressure high-temperature metal pipe or hose and that the outside of the flow-path pipe 30 is covered with an insulating material in order to prevent heat loss.

Of course, the refrigerant to be introduced into the condenser 20 is not limited to being discharged from the compressor 10. The refrigerant may be introduced from various other components into the condenser 20 according to an integrated thermal control circuit for a vehicle.

Figure 2:
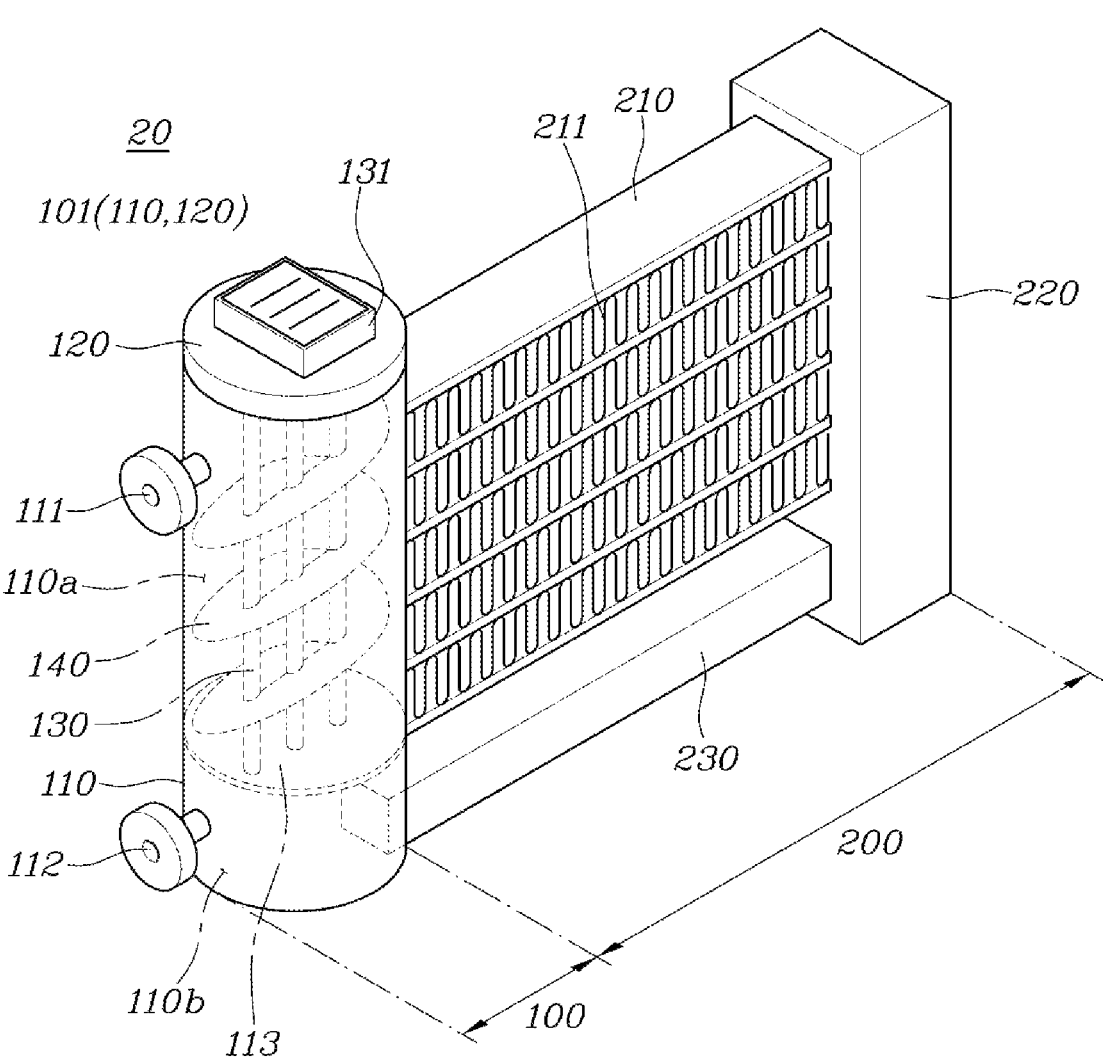
FIG. 2 is a perspective view illustrating the vehicle condenser according to the first embodiment of the present invention.
Figure 3:
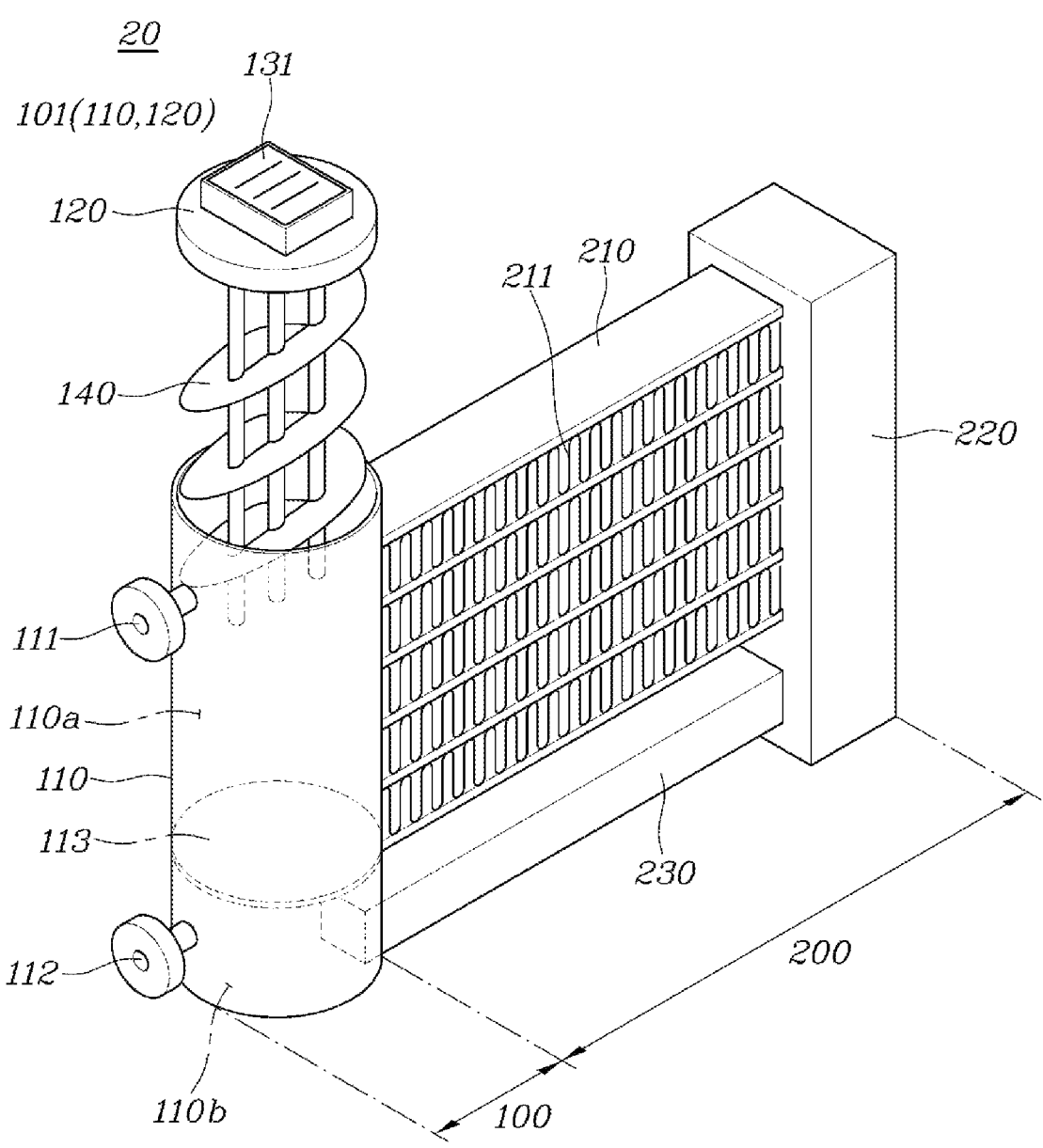
FIG. 3 is an exploded perspective view illustrating a portion of the vehicle condenser according to the first embodiment of the present invention.
Figure 4:
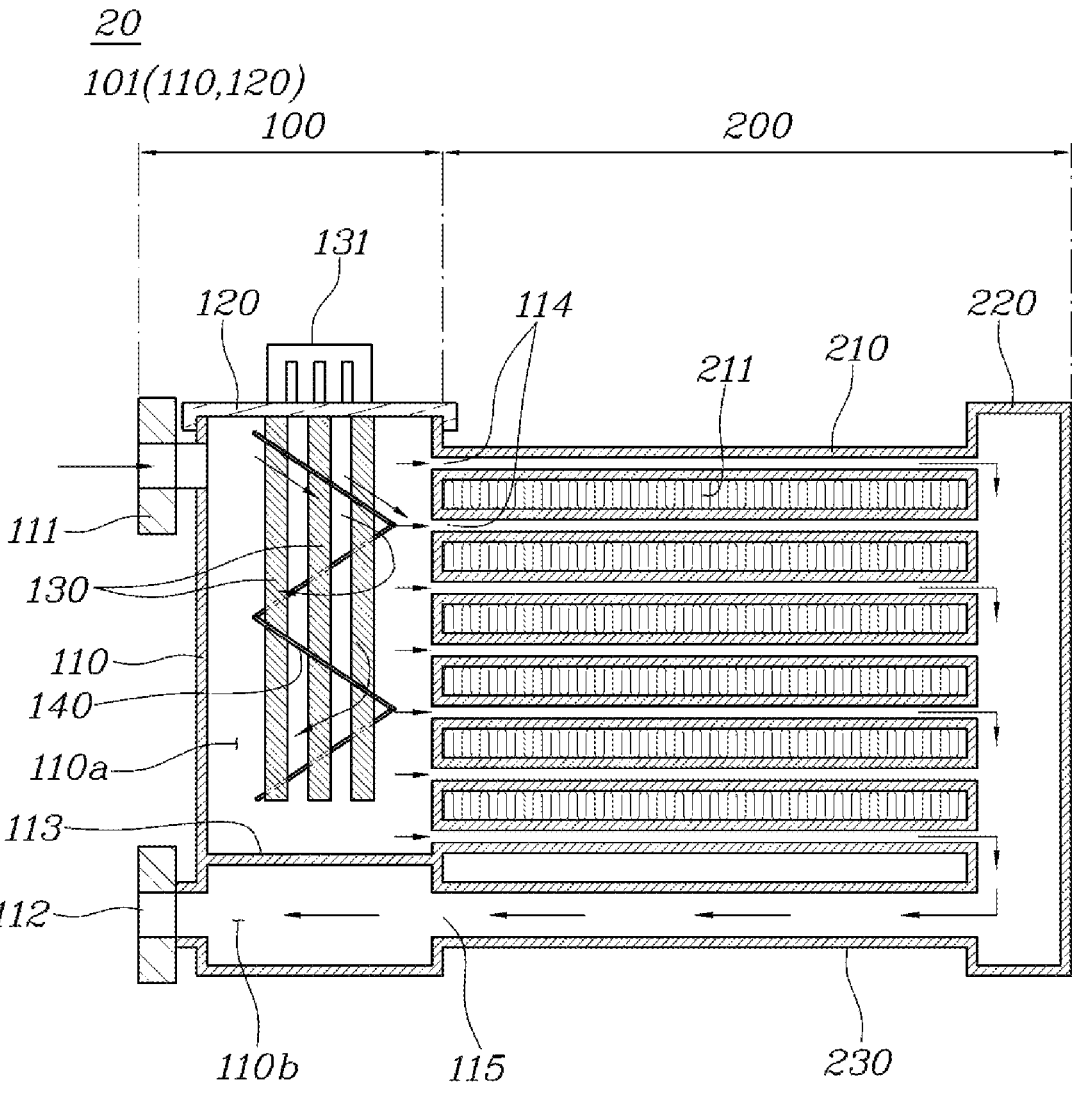
FIG. 4 is a vertical cross-sectional view illustrating the vehicle condenser according to the first embodiment of the present invention.
Figure 5:
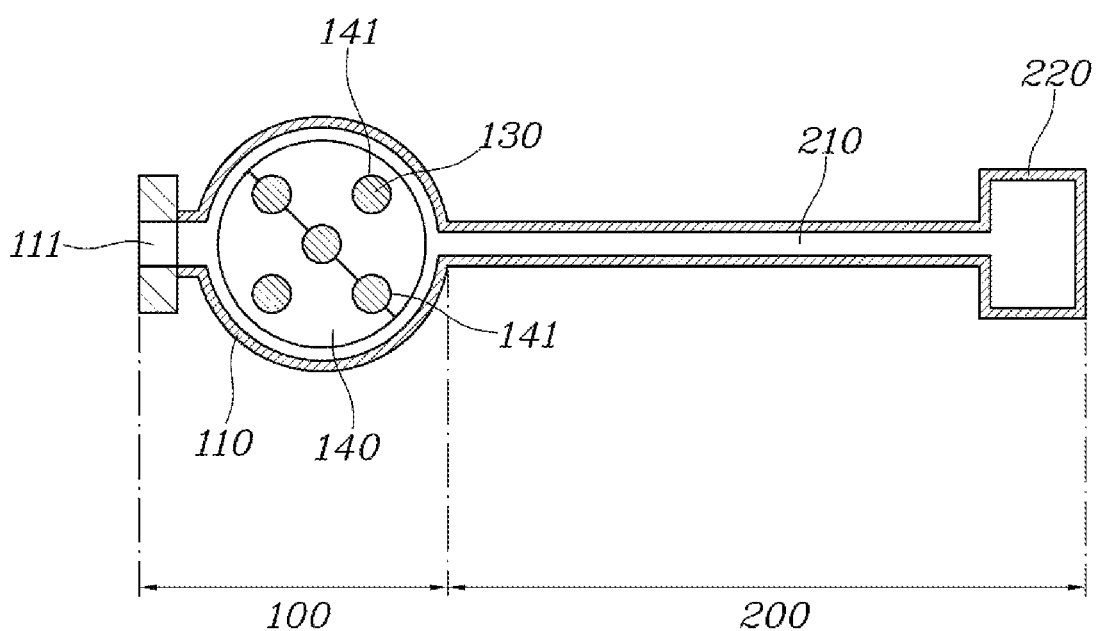
FIG. 5 is a horizontal cross-sectional view illustrating the vehicle condenser according to the first embodiment of the present invention.

FIG. 2 is a perspective view illustrating the vehicle condenser according to the first embodiment of the present invention. FIG. 3 is an exploded perspective view illustrating a portion of the vehicle condenser according to the first embodiment of the present invention. FIG. 4 is a vertical cross-sectional view illustrating the vehicle condenser according to the first embodiment of the present invention. FIG. 5 is a horizontal cross-sectional view illustrating the vehicle condenser according to the first embodiment of the present invention.

As illustrated in FIGS. 2 to 5, the vehicle condenser 20 according to the first embodiment of the present invention includes the heating unit 100 and the heat exchange unit 200. The heating unit 100 heats the refrigerant. The heat exchange unit 200 causes the heated refrigerant to exchange heat with the air flowing in the indoor heating, ventilation and air conditioning apparatus.

The heating unit 100 is a component into which the refrigerant circulating for air conditioning and heating is introduced for being heated. The heating unit 100 is integrally formed with the heat exchange unit 200 and constitutes the condenser 20.

The heating unit 100 has internal spaces 110a and 110b inside. The refrigerant is introduced into the internal spaces 110a and 110b. The heating unit 100 heats the refrigerant flowing in the internal spaces 110a and 110b.

To this end, the heating unit 100 includes a heater housing 101, a heater main body 130, and a guide bracket 140. The internal spaces 110a and 110b in which the refrigerant flows are provided in the heater housing 101. The heater main body 130 is provided in the internal space 110a in the heater housing 101 and heats the flowing refrigerant. The guide bracket 140 is provided in the internal space 110a in the heater housing 101 and holds the heater main body 130 in place in the internal space 110a in the housing 101.

The heater housing 101 serves as a component that provides a space in which the refrigerant flows. The heater housing 101 is partitioned into a first internal space 110a and a second internal space 110b. The refrigerant is introduced in the first internal space 110a and is heated therein. The refrigerant is discharged from the second internal space 110b. In this case, it is desirable that the heater housing 101 is partitioned by a partition wall 113 in an upward-downward direction into the first internal space 110a and the second internal space 110b.

For example, the heater housing 101 is partitioned by the partition wall 113 into the internal spaces 110a and 110b and thus is open at the top. Accordingly, the heater housing 101 includes a heater body 110 and a heater cover 120. The heater body 110 has the first internal space 110a that is open at the top, and the second internal space 110b that is sealed. The heater cover 120 covers the top of the first internal space 110a and thus seals the first internal space 110a.

In this case, the heater body 110 is formed in the shape of a cylinder that is approximately closed at the bottom and is open at the top. Therefore, it is desirable that the housing 101 is assembled in such a manner that the heater cover 120 formed in the shape of a circle covers the top of heater body 110.

The refrigerant is introduced into the first internal space 110a and is heated while flowing therein. The first internal space 110a is a space in which the heated refrigerant is caused to flow to the heat exchange unit 200. An inlet port 111 through which the refrigerant is introduced is provided in one lateral surface on the first internal space 110a side of the heater body 110. At least one first connection hole 114 communicating with the heat exchange unit 200 in such a manner that the refrigerant heated in the first internal space 110a flows to the heat exchange unit 200 is formed in the other lateral surface on the first internal space 110a side of the heater body 110.

In this case, the inlet port 111 is formed in such a manner as to be arranged as upward toward the top of the heater body 100 as possible. Therefore, it is desirable that a path along which the refrigerant introduced through the inlet port 111 flows in the first internal space 110a is extended.

A plurality of first connection holes 114 are formed in such a manner as to be spaced apart a predetermined distance in the upward-downward direction. It is desirable that the plurality of first connection holes 114 are formed in such a manner as to be spaced apart an equal distance in the upward-downward direction.

The heater main body 130 and the guide bracket 140 are mounted in the first internal space 110a in the heater body 110. In order to facilitate the mounting of the heater main body 130 and the guide bracket 140, it is desirable that the heater main body 130 and the guide bracket 140 are provided together with the heater cover 120.

For example, the heater main body 130 is mounted on a lower surface of the heater cover 120, and the heater main body 130 is fixed with the guide bracket 140.

A terminal module 131 for applying electric power to the heater main body 130 may be mounted on an upper surface of the heater cover 120.

The refrigerant heated in the first internal space 110a exchanges heat with the air flowing in the indoor heating, ventilation, and air conditioning (HVAC) apparatus while passing through the heat exchange unit 200. Then, the refrigerant passes through the second internal space 110b for being discharged from the condenser 20.

Therefore, an outlet poll 112 through which the refrigerant is discharged is provided in one lateral surface on the second internal space 110b side of the heater body 110. At least one second connection hole 115 communicates with the heat exchange unit 200 in such a manner that, after exchanging heat in the heat exchange unit 200, the refrigerant flows to the second internal space 110b that is formed in the other lateral surface on the second internal space 110b side of the heater body 110. In this case, it is desirable that a cross-sectional area of the second connection hole 115 and the number of the second connection holes 115 are determined by considering an amount of flowing refrigerant.

For example, it is desirable that one second connection hole 115 is formed and that the one second connection hole 115 is formed in such a manner that a cross-sectional area thereof corresponds to the sum of respective cross-sectional areas of the plurality of first connection holes 114.

Therefore, it is desirable that the refrigerant flowing from the first internal space 110a to the heat exchange unit 200 flows back to the second internal space 110b at a predetermined flow rate without any change in an amount of the flow.

It is desirable that a flowing path for the refrigerant is extended in such a manner that the refrigerant is heated to a desired temperature level while flowing in the first internal space 110a in the heater body 110.

To this end, the guide bracket 140 mounted in the heater body 110 may serve to guide extending of the path along which the refrigerant introduced into the first internal space 110a in the heater body 110 flows.

The heater main body 130 serves as a component that heats the refrigerant. The heater main body 130 is heated by applying electric power thereto, and thus heats the refrigerant flowing around the heater main body 130. For example, a sheath heater may find application in the heater main body 130.

To this end, the heater main body 130 is formed in the shape of a bar. At least one heater main body 130 is arranged in the upward-downward direction in an internal space in the heater housing 101, that is, in the first internal space 110a in the heater body 110 in a state where an upper end portion thereof is mounted on the lower surface of the heater cover 120.

For example, five heater main bodies 130 may be provided. Among these, one heater main body 130 may be arranged in the center of the first internal space 110a, and the other four heater main bodies 130 may be arranged to be spaced apart an equal distance around a circumference of a circle that has a common center with the first internal space 110a.

It is desirable that the guide bracket 140 is formed to be wrapped in a helical shape around a plurality of heater main bodies 130, that is, around the four heater main bodies 130 arranged to be spaced apart an equal distance around the circumference of the circle. In this case, it is desirable that the guide bracket 140 is formed in the helical shape in a direction from upward to downward.

The refrigerant introduced into the first internal space 110a through the inlet port 111 provided in the upper side of the heater body 110 is heated by the heater main body 130 while flowing along the guide bracket 140 in a manner that is wrapped around the heater main body 130.

In this case, it is desirable that an outermost surface of the guide bracket 140 is not brought into contact with the heater body 110. Thus, the refrigerant also flows to a space between the guide bracket 140 and an internal surface of the heater body 110 and at the same time also flows to the heat exchange unit 200 through the first connection hole 114 formed in the heater body 110.

A mounting hole 141 may be formed in the guide bracket 140. The heater main body 130 is inserted into the mounting hole 141 and thus is held in place therein. For example, the mounting hole 141 may be formed in the shape of a circle in such a manner that the heater main body 130 passes therethrough and may be formed in the shape of a semicircle in such a manner that only one portion of the heater main body 130 passes therethrough.

The plurality of heater main bodies 130 are inserted into the mounting holes 141, respectively, and thus are held in place therein. Therefore, although the guide bracket 140 is not fixed to the lower surface of the heater cover 120, the guide bracket 140 may be mounted in the first internal space 110a in a fixed state. However, it is desirable that the upper end portion of the guide bracket 140 is fixed on the lower surface of the heater cover 120, resulting in being more firmly held in place in the first internal space 110a.

A structure that guides the path along which the refrigerant introduced into the first internal space 110a in the heater body 110 flows may be variously changed for realization.

Figure 6:
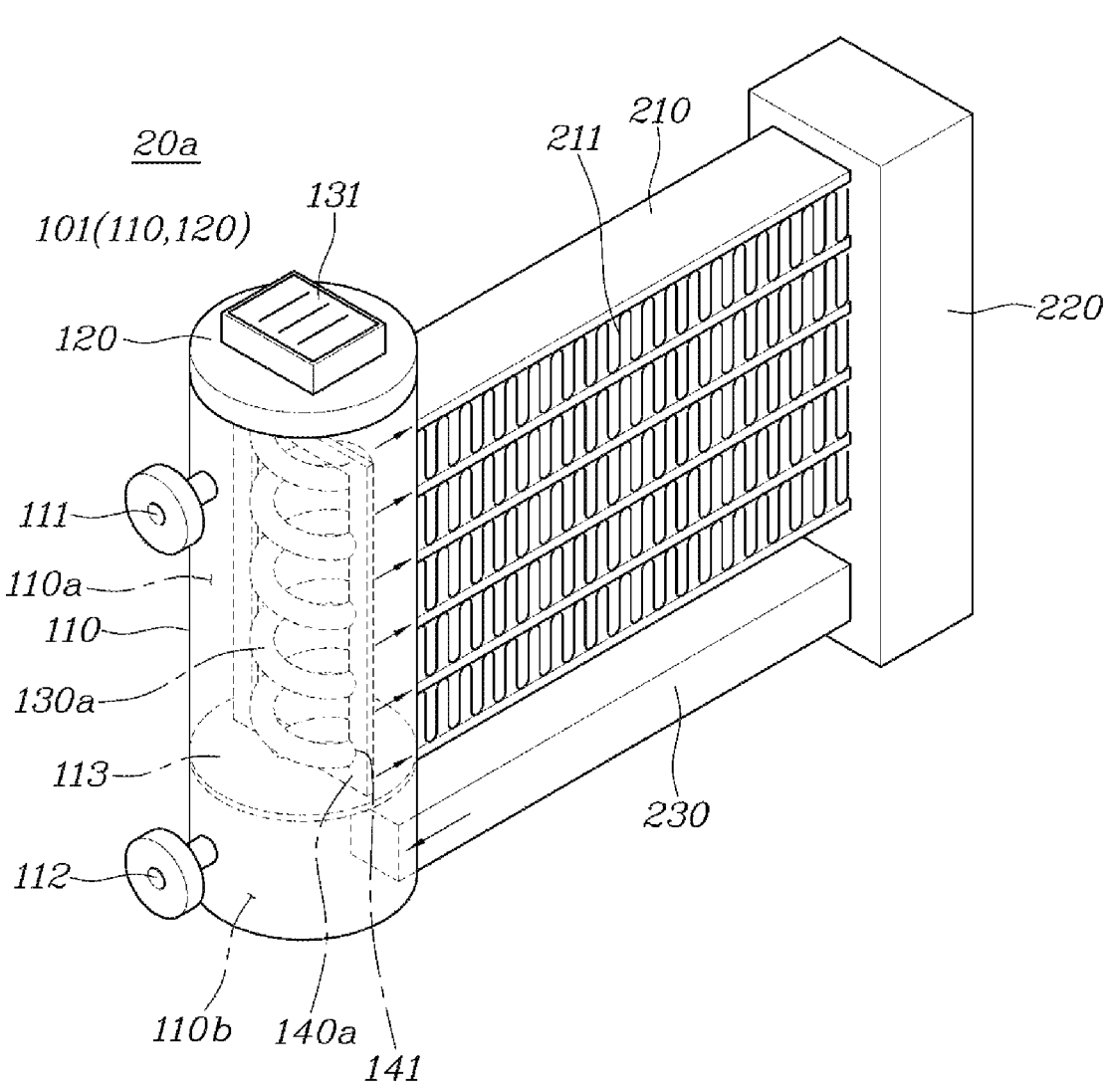
FIG. 6 is a perspective view illustrating a vehicle condenser according to a second embodiment of the present invention.

For example, FIG. 6 is a perspective view illustrating a vehicle condenser 20a according to a second embodiment of the present invention.

Unlike in the first embodiment in which the path along which the refrigerant flows is guided by the guide bracket 140, in the second embodiment, the path along which the refrigerant flows is guided by a shape of the heater main body 130a.

As illustrated in FIG. 6, the heater main body 130a is formed in the helical shape and is arranged in the upward-downward direction in an internal space in the heater housing 101, that is, in the first internal space 110a in the heater body 110.

Therefore, the refrigerant introduced into the first internal space 110a through the inlet port 111 provided in the upper side of the heater body 110 is heated by the heater main body 130a while flowing along the heater main body 130a in a manner that forms the helical shape.

It is desirable that a guide bracket 140a is formed to a rectangular-frame shape that fixes the heater main body 130a by encircling the heater main body 130a from an outward direction. In this case, it is desirable that the mounting hole 141 in the shape of a semi-circle into which the heater main body 130a is to be inserted for fixation is formed in an inner circumferential surface of the guide bracket 140a.

The heat exchange unit 200 serves as a component that is integrated with the heating unit 100 and causes the refrigerant heated in the heating unit 100 to exchange heat with the air flowing around the heating unit 100, that is, with the air flowing in the indoor heating, ventilation and air conditioning (HVAC) apparatus. The heat exchange unit 200 may be formed to have a structure similar to that of an indoor condenser that finds application in a heat pump system for a general vehicle.

For example, the heat exchange unit 200 includes a plurality of flow-path pipes 210 and a tank 220. One side of each of the plurality of flow-path pipes 210 is integrally connected to the heating unit 100. Thus, while flowing along each of the plurality of flow-path pipes 210, the refrigerant heated in the heating unit 100 exchanges heat with the air flowing in the indoor heating, ventilation and air conditioning (HVAC) apparatus. The tank 220 is integrally connected to the other side of each of the plurality of flow-path pipes 210. Thus, after exchanging heat in the plurality of flow-path pipes 210, the refrigerant collects in the tank 220.

The heat exchange unit 200 may further include a return pipe 230. Along the return pipe 230, the refrigerant collecting in the tank 220 flows to the heating unit 100 in order to be discharged after flowing through the heating unit 100.

The plurality of flow-path pipes 210 is provided. Each of the plurality of flow-path pipes 210 is connected to the first internal space 110a in the heater body 110. Then, the refrigerant heated while flowing in the first internal space 110a is introduced into the plurality of flow-path pipes 210 and flows therein.

At this point, it is desirable that the plurality of flow-path pipes 210 are arranged to be spaced apart a distance in the upward-downward direction in a lateral portion of the heater body 110, and more specifically, in a lateral surface on the first internal space 110a side of the heater body 110. Then, a heat sink fin 211 is arranged in a space between the flow-path pipes 210 adjacent to each other. The heat sink fin

211 increases the heat exchange efficiency of the refrigerant by serving as an extension to a surface area of the flow-path pipe 210.

In this case, a shape of the heat sink fin 211 may be variously formed. For example, the heat sink fin 211 is manufactured in the form of a corrugated plate or a wrinkled plate. The heat sink fin 211 in this shape may be arranged to be brought into contact with an external surface of the flow-path pipe 210. Alternatively, the heat sink fin 211 in this shape may be integrally formed with the flow-path pipe 210. Thus, the surface area of the flow-path pipe 210 can be increased.

The tank 220 serves as a component that is integrally connected to the other side of each of the plurality of flow-path pipes 210 and provides a space in which the refrigerant collects. For application, the tank 220 may vary widely in shape and capacity within a range that does not have an effect on the amount of flowing refrigerant.

In addition, the return pipe 230 serves as a component along which the refrigerant collecting in the tank 220 flows to the heater housing 101 of the heating unit 100, and more particularly, to the second internal space 110b in the heater body 110 in order to be discharged to the outside of the condenser 20 through the outlet port 112.

Then, for application, the return pipe 230 may vary widely in shape and number within a range that does not have an effect on the amount of flowing refrigerant.

For example, one return pipe 230 is provided in such a manner as to correspond to the number of the second connection holes 115 formed in the second internal space 110b in the heater body 110. In this case, it is desirable that the one return pipe 230 is formed in such a manner that a cross-sectional area thereof corresponds to the sum of the cross-sectional areas of the plurality of flow-path pipes 210.

An operation state of the vehicle condenser according to the second embodiment, which is configured as described above, will be described with reference to the drawings.

As illustrated in FIG. 4, the refrigerant introduced through the inlet port 111 into the first internal space 110a in the heater body 110 is caused, by the structure of the guide bracket 140, to flow in a manner that is helically wrapped around the heater main body 130. While flowing in this manner, the refrigerant is heated by the heater main body 130.

The refrigerant heated while flowing in the first internal space 110a flows to the plurality of flow-path pipes 210 through the plurality of first connection holes 114.

While flowing to the outside of the flow-path pipe 210, that is, while flowing in the indoor heating, ventilation and air conditioning apparatus, the refrigerant introduced into the plurality of flow-path pipes 210 exchanges heat with air introduced into the vehicle, and loses heat, thereby being cooled. At this point, the heat exchange efficiency is improved by the heat sink fin 211 that serves as an extension to the surface area of the flow-path pipe 210.

After exchanging heat while flowing along the plurality of flow-path pipes 210, the refrigerant collects in the tank 220. The refrigerant collecting in the tank 220 flows to the second internal space 110b in the heater body 110 through the return pipe 230.

Then, the refrigerant flows to the outside of the condenser 20, that is, to a different component that constitutes the heat pump system, through the outlet port 112 provided in the second internal space 110b.

The present invention is limited to the embodiments thereof, which are described above with reference to the accompanying drawings, and the scope thereof is defined by the following claims. Therefore, it would be apparent to a person of ordinary skill in the art that various modifications and alterations may be made to the present invention without departing from the scope of the technical idea of the present invention.

What is claimed is:

1. A vehicle condenser comprising:
a heater comprising an internal space coupled to receive a refrigerant; and
a heat exchanger integrally formed with the heater and configured to allow the refrigerant heated in the heater to exchange heat with ambient air
wherein the heater comprises:
a heater housing comprising the internal space configured to allow the refrigerant to flow therethrough;
a heater main body provided in the internal space in the heater housing and configured to heat the refrigerant;
a guide bracket provided in the internal space in the heater housing to hold the heater main body in place in the internal space in the heater housing; and
additional heater main bodies,
wherein:
the guide bracket defines a flow path for the refrigerant introduced into the internal space in the heater housing,
the heater main body and the additional heater main bodies each have a bar shape,
the heater main body and the additional heater main bodies are arranged in an upward-downward direction in the internal space in the heater housing, and
the guide bracket is wrapped in a helical shape around the heater main body and the additional heater main bodies.

2. The vehicle condenser of claim 1, wherein the heater housing further comprises:
a heater body comprising an the internal space partitioned by a partition wall into a first internal space open at a top and a second internal space that is sealed; and
a heater cover covering the top of the first internal space to seal the first internal space.

3. The vehicle condenser of claim 2, wherein:
the heater main body and the guide bracket are mounted in the first internal space, and
the heater body comprises:
an inlet port provided in a first lateral surface on a first internal space side of the heater body, the inlet port being configured to introduce the refrigerant;
at least one first connection hole provided in a second lateral surface on the first internal space side of the heater body, the first connection hole being in communication with the heat exchanger such that the refrigerant heated in the first internal space flows to the heat exchanger;
an outlet port provided in a first lateral surface on a second internal space side of the heater body, the outlet port being configured to discharge the refrigerant; and
at least one second connection hole provided in a second lateral surface on the second internal space side of the heater body, the second connection hole being in communication with the heat exchanger such that, after heat is exchanged in the heat exchanger, the refrigerant flows to the second internal space.

4. A method for operating a vehicle condenser, the method comprising:

heating a refrigerant received in an internal space of a heater; and flowing the refrigerant out of the heater and into a heat exchanger integrally formed with the heater, wherein the refrigerant heated in the heater exchanges heat with ambient air through the heat exchanger, wherein:

heating the refrigerant comprises:

flowing the refrigerant through a heater housing of the heater, the heater housing comprising the internal space; and heating the refrigerant using a heater main body provided in the internal space, a guide bracket is provided in the internal space in the heater housing to hold the heater main body in place in the internal space in the heater housing, the guide bracket defines a flow path for the refrigerant introduced into the internal space in the heater housing, the heater further comprises additional heater main bodies, the heater main body and the additional heater main bodies each have a bar shape, the heater main body and the additional heater main bodies are arranged in an upward-downward direction in the internal space in the heater housing, and the guide bracket is wrapped in a helical shape around the heater main body and the additional heater main bodies.

5. The method of claim 3, wherein;

the internal space is partitioned by a partition wall into a first internal space open at a top and a second internal space that is sealed, and the top of the first internal space is covered with a heater cover to seal the first internal space.

6. The method of claim 5, wherein:

the heater main body and the guide bracket are mounted in the first internal space, and heating the refrigerant further comprises:

introducing the refrigerant to the heater through an inlet port provided in a first lateral surface on a first internal space side of the heater body;

flowing the refrigerant heated in the heater to the heat exchanger via at least one first connection hole provided in a second lateral surface on the first internal space side of the heater body, the first connection hole being in communication with the heat exchanger such that the refrigerant heated in the first internal space flows to the heat exchanger;

discharging the refrigerant through an outlet port provided in a first lateral surface on a second internal space side of the heater body; and after heat is exchanged in the heat exchanger, flowing the refrigerant to the second internal space via at least one second connection hole provided in a second lateral surface on the second internal space side of the heater body, the second connection hole being in communication with the heat exchanger.

\* \* \* \* \*